United States Patent [19]

Noël

[11] 4,048,417
[45] Sept. 13, 1977

[54] PROCESS FOR PREVENTING BUILD-UP IN POLYMERIZATION REACTORS

[75] Inventor: Stéphane Noël, Vilvoorde, Belgium

[73] Assignee: Solvay & Cie., Brussels, Belgium

[21] Appl. No.: 649,020

[22] Filed: Jan. 14, 1976

[30] Foreign Application Priority Data

Feb. 13, 1975 Luxembourg .......................... 71833
July 18, 1975 Luxembourg .......................... 73025

[51] Int. Cl.² .............................................. C08F 2/00
[52] U.S. Cl. ..................................... 526/62; 528/484
[58] Field of Search ..................... 526/62, 74; 528/484

[56] References Cited

U.S. PATENT DOCUMENTS

| 3,764,384 | 10/1973 | Berni ...................................... 526/484 |
| 3,962,202 | 6/1976 | Morningstar ......................... 526/74 |

FOREIGN PATENT DOCUMENTS

| 19,895 | 6/1972 | Japan ..................................... 526/74 |
| 19,896 | 6/1972 | Japan ..................................... 528/484 |
| 1,428,585 | 3/1976 | United Kingdom ................. 528/484 |

Primary Examiner—Alan Holler
Attorney, Agent, or Firm—Spencer & Kaye

[57] ABSTRACT

Process for preventing build-up in the reactors used in the free radical polymerization of ethylenically unsaturated monomers, and more particularly of vinyl chloride, in which the reactor walls are subjected to heat treatment before the reactors are charged in preparation for the polymerization process.

15 Claims, No Drawings

PROCESS FOR PREVENTING BUILD-UP IN POLYMERIZATION REACTORS

The present invention relates to a process for preventing build-up in polymerisation reactors, more particularly build-up in the reactors used in the free radical polymerisation of ethylenically unsaturated monomers.

Polymers derived from ethylenically unsaturated monomers and obtained by free radical polymerisation have appropriated a large share of the world synthetic polymer market. The polymerisation processes most commonly used for producing such polymers employ the techniques of polymerisation in bulk, solution and aqueous dispersion. These techniques which have formed the object of many technological improvements and all of which have their particular advantages share the serious drawback of giving rise to the build-up of an unusable by-product on the walls of the polymerisation reactors. They are customarily carried out batchwise for a variety of reasons.

The presence of build-up is highly undesirable for two reasons: it contaminates the polymer produced in subsequent cycles and reduces the heat transfer capacity of the reactor wall.

It is therefore indispensable to clean the reactor walls thoroughly after each polymerisation cycle. Cleaning is generally carried out mechanically. The commonest method is to use high energy jets of water. This is obviously a long, laborious and costly operation.

Furthermore the build-up that forms throughout polymerisation disrupts the smooth running of the process and makes it more difficult to control.

Several methods for reducing build-up in polymerisation autoclaves have already been considered. They generally consist in coating the reactor walls with anti-buildup agents or incorporating them in the polymerisation medium. These agents usually have either a reducing or an inhibiting effect on free radical polymerisation. Examples of such materials include the water-soluble salts of ethylene diamine tetra-acetic acid (French Pat. No. 1,576,706 of 23.7.1968 to the Dow Chemical Co.) and aromatic compounds such as phenol, cumylphenol or α-methylstyrene (U.S. Pat. No. 3,778,423 of 28.6.1971 to Universal PVC Resins).

These prior art methods have not proved to be very effective however. Furthermore they possess the disadvantage of contributing to the contamination of the resulting polymers.

There has now been found in accordance with the present invention, a simple, effective and economic method of preventing build-up in polymerisation reactors which does not possess the disadvantages of the prior art processes and which in particular does not contribute to the contamination of the resins that results from the introduction into the polymerisation medium of materials unconnected with the polymerisation process as such.

The present invention therefore relates to a process for preventing build-up in reactors during the free radical polymerisation of ethylenically unsaturated monomers in which the reactor walls are subjected to heat treatment before the reactors are charged in preparation for the polymerisation process.

The temperature at which heat treatment is carried out, which is generally higher than 40° C and preferably higher than the temperature at which the polymerisation reaction preceding heat treatment was carried out, is not particularly critical however. It can vary over a relatively wide range depending on the other operating conditions, particularly the polymerisation time and pressure. However, it is advisable to operate at a temperature above 60° C and preferably above 75° C in order to render the treatment as effective and brief as possible. No secondary effect is observed when operating at appreciably higher temperatures such as 150° C. For practical reasons however it is preferable to operate at temperatures below 120° C and preferably below 100° C.

The reactor walls may be heated in any desired way. It is advantageous to make use of the double jacket with which the reactor is customarily provided and to circulate a heating fluid such as water through it. Thus the temperature at which heat treatment is carried out does not generally exceed 100° C in order to make it possible to operate at atmospheric pressure.

The duration of heat treatment may vary. In practice the optimum duration must be determined experimentally in each particular case. It depends more particularly on the condition of the surface of the treated wall, the temperature employed, the polymerisation formulation and temperature and the desired effect. In most cases a duration of more than one minute and less than 60 minutes will suffice to bring about a very appreciable reduction in build-up on the reactor walls. To obtain both an industrially significant reduction in build-up and a substantial increase in productivity, however, it is preferable to keep the autoclave walls hot for less than 30 minutes. In the most favourable circumstances a period of between about 5 and about 20 minutes will suffice.

It has also been found that the application of a partial vacuum to the reactor before, during and/or after heat treatment further improves its beneficial effect. The vacuum is preferably applied during heat treatment.

The amount of partial vacuum applied to the reactor has not been found to be critical. Thus even a pressure of less than 350 mm of mercury absolute gives excellent results. For preference the reactor is maintained at a pressure below 100 mm of mercury absolute during heat treatment.

It has also been found that it is advantageous for the walls subjected to heat treatment to be swept with a stream of gas. Sweeping can be used to advantage for supplying the walls with all or part of the heat required for heat treatment. The sweeping gas is preferably employed at a temperature that is sufficiently high to prevent any condensation on the walls. Sweeping also serves to dry the walls.

It has also been found that sweeping can be used to advantage for recovering the residual monomer or monomers still present in the reactor after evacuation of the charge of the previous polymerisation run.

When the desired conversion of monomer to polymer has been reached it is customary to discharge the reaction medium into a stripper which is maintained under vacuum and connected to a gas holder. As soon as the pressure in the reactor has approximately reached the pressure prevailing in the gas holder the stripper is disconnected and the vacuum pump is directly connected to the reactor, draws off the gaseous atmosphere, which consists essentially of monomer and steam, and conveys it to the gas holder.

The vacuum pumps customarily used for evacuating the reactor after the polymer has been discharged do not usually permit the removal of all the residual monomers; they do not generally enable the residual pressure to be reduced to a value below about 150 mm of mercury absolute. The final traces of residual monomer are usually removed from the reactor by sweeping with air which is discharged to atmosphere.

It has been found that the heat treatment of the reactors accompanied by sweeping with a gaseous stream before the reactors are charged for polymerisation can be used to advantage for removing and recovering the residual monomers still present in the reactor after the preceding polymerisation charge has been removed.

In a preferred embodiment of the present invention heat treatment and sweeping are therefore carried out immediately after the preceding polymerisation charge has been removed from the reactor and the gaseous effluent is condensed to recover the residual monomers.

In addition to reducing build-up on the reactor walls this embodiment therefore permits the removal (by stripping) and the recovery (by condensation) of the residual monomers present in the reactor after the reaction medium used in the previous polymerisation run has been discharged to the further treatment units.

The nature of the sweeping gas is not particularly critical. Air or an inert gas such as nitrogen or carbon monoxide can be used for example. It is also possible to use vapours that are inert under the heat treatment conditions, as for example hydrocarbon vapours, optionally halogenated, or steam.

The effectiveness of the treatment is not a function of the nature of the gas used as the sweeping gas. However, when sweeping is to be used as a means of removing and recovering the residual monomers it is preferable for sweeping to be effected with an inert gas or steam. The use of steam for sweeping the reactor walls is particularly preferred. In this case the stripped monomers can be readily separated out by condensing the steam in the gaseous effluent and the monomers thereby recovered recycled to the polymerisation system after treatment.

As heat treatment does not generally entail using temperatures about 100° C and it is advantageous, as stated above, to prevent any condensation on the reactor walls during treatment, a vacuum pump must be used to prevent the steam used for sweeping from condensing in the reactor during heat treatment.

All types of vacuum pump customarily employed can be used. Ejectors may be used for instance. However, as ejectors consume a large amount of energy it is preferable to use rotary pumps such as liquid ring pumps.

The treatment according to the invention can, of course, be carried out in installations where a vacuum pump is directly connected to the treatment vessel. In such cases the condenser is installed downstream of the vacuum pump. However, it has been found that this arrangement has serious drawbacks. If an ejector is used as the vacuum pump the steam consumption of the ejector is prohibitive in view of the large volume of gaseous effluent. Furthermore, the total amount of vapour, which is extremely large, necessitates the use of a very large volume condenser. If a rotary pump is used as the vacuum pump, very frequent breakdowns occur accompanied by rapid deterioration of the pump which might be due to the elevated temperature and chemical nature of the discharged vapours.

It has been found that these problems can be readily solved by placing the condenser between the reactor and the vacuum pump. It is preferable to use an exchanger-type condenser whose dimensions are such that a very substantial part of the steam leaving the reactor is condensed throughout the treatment.

The process of the present invention is applicable indiscriminately to the reactors used in the polymerisation and copolymerisation of all ethylenically unsaturated monomers.

Examples of this include the polymerisation of vinyl and vinylidene halides such as vinyl and vinylidene chloride and fluoride nitriles and esters of ethylenically unsaturated monocarboxylic acids such as acrylonitrile and methyl acrylate and aromatic olefines such as styrene.

The process according to the invention is more particularly applicable to the reactors used in the polymerisation of vinyl chloride.

By polymerisation of vinyl chloride we mean the homopolymerisation of vinyl chloride and the copolymerisation of a mixture of monomers containing a predominance and preferably more than 80% of vinyl chloride as for example mixtures of vinyl chloride with vinyl acetate, propylene or ethylene.

The process according to the invention can also be used with all conventional methods for polymerising ethylenically unsaturated monomers and, more particularly, polymerisation in bulk, solution or aqueous dispersion. It is preferably used, however, for polymerisation in aqueous suspension and aqueous emulsion carried out in the presence of conventional ingredients, ie dispersing or emulsifying agents and oil or water-soluble catalysts, together if desired with various additives such as stabilisers, plasticisers, colorants, reinforcing agents and processing auxiliaries which may be incorporated at any stage of polymerisation.

The process according to the invention is more particularly applicable to polymerisation in aqueous suspension which is the most demanding from the point of view of cleanliness of the reactor walls.

At the end of a polymenisation the reaction medium which primarily contains the polymer frequently accompanied by excess monomer and many other constituents is discharged from the reactor to the further treatment units. The treatment according to the invention is preferably conducted after this discharge step. It is preferably carried out when there is no liquid or solid phase whatsoever in the reactor and at all events before all the constituents for the next polymerisation cycle are introduced. If, for one reason or another, build-up is present on the walls of the reactor to be treated, it should preferably be removed by the conventional mechanical methods before carrying out heat treatment. In such cases the residual monomer will of course be removed from the reactor first.

The frequency with which treatment has to be carried out varies considerably and must be determined experimentally. It depends more particularly on the operating conditions both of the treatment itself and of the polymerisation and on the condition of the wall surface. Under normal circumstances with a routine production run and a reactor in good condition the treatment will suffice to prevent build-up during several polymerisation cycles which can thus take place without interruption and without the intermediate cooling of the reactor. However, in cases where it is desired to use heat treatment as a means of removing and recovering the residual monomer, it is advisable to carry out the said treatment after each polymerisation cycle.

When the process forming the object of the present invention is applied to a reactor used for polymerisation in an aqueous medium, the productivity of the autoclave can be further improved by charging it with pre-heated water after the treatment according to the invention. The pre-heated water is preferably used at a temperature that is sufficiently high to heat the total charge (comprising the monomer and the other polymerisation ingredients) to the selected polymerisation temperature, taking into account the heat supplied via the wall as a result of heat treatment. Thus polymerisation can start immediately after the charging of the reactor and the overall cycle time is appreciably shortened.

It has surprisingly been found that the mere fact of heat treating the walls of the uncharged reactor brings about a considerable reduction is build-up during the free radical polymerisation of ethylenically unsaturated monomers and makes it completely unnecessary to employ any other measures such as pre-treatment of the walls or the incorporation of anti-build-up agents in the polymerisation medium.

The application of the process of the present invention to a reactor for the suspension polymerisation of vinyl chloride, the surface of whose walls was in good condition, enabled a sequence of some twelve polymerisation cycles to be carried out without intermediate cleaning, solely with intermediate sweeping of the walls.

When the process of the present invention is applied under the same conditions to a worn reactor with surface defects, it very appreciably reduces the amount of build-up on the walls. No build-up that is difficult to remove is ever found and it only appears at all after several polymerisation cycles.

The process of the invention therefore enables a very extensive reduction to be made in the average length of time devoted to cleaning the reactor walls in each polymerisation cycle. In addition, it enables the heating up time of the polymerisation medium to be significantly shortened. All these factors contribute towards increasing the productivity of the reactors used in the free radical polymerisation of ethylenically unsaturated monomers.

The following examples illustrate the invention without however restricting it.

They relate to the polymerisation of vinyl chloride in aqueous suspension in a 300 litre stainless steel autoclave whose walls have been subjected to heat treatment in accordance with the invention.

EXAMPLE 1

The clean, empty autoclave is closed and heated by circulating hot water through its double jacket. As soon as the autoclave walls have reached a temperature of 80° C (time = $t_o$), the autoclave is purged with air several times. A partial vacuum corresponding to a residual pressure of the order of 100 mm Hg absolute is then applied, followed by purging of the autoclave with nitrogen, after which the autoclave walls are kept at a temperature of 80° C for 15 minutes while maintaining the partial vacuum. At the end of this period, with the autoclave still closed, the polymerisation ingredients are injected, namely:

pre-heated demineralised water - 145 kg
dispersing agent - 132.5 g
azo-bis-valeronitrile - 56 g
vinyl chloride 98 kg Polymerisation starts immediately. The vinyl chloride is vented when the pressure drop reaches 3 kg/cm$^2$ and the autoclave is discharged.

Inspection of the autoclave walls reveals that they are completely free from any adhering film.

It was found possible to repeat a similar polymerisation cycle 14 times before extensive cleaning of the autoclave became necessary.

EXAMPLE 2

Example 2 illustrates the polymerisation of vinyl chloride in aqueous dispersion in the presence of diethylperoxydicarbonate prepared outside the autoclave by reacting diethyl chloroformate with hydrogen peroxide in the presence of water, methylene chloride and sodium hydroxide in accordance with the process forming the object of the Applicants' French Patent Application No. 73 43 563 of December 5, 1973.

The autoclave is subjected to the same treatment as that described in Example 1. However, the vacuum is broken with air at the end of the wall heating period (duration: 15 minutes). After opening the autoclave the following polymerisation ingredients are injected:

demineralised water - 145 kg
dispersing agent at $t_o$ - 127.5 g
at $t_o$ + 3h - 35 g
diethylperoxydicarbonate (previously prepared) - 28 g
vinyl chloride - 100 kg The polymerisation medium is heated to 70° C and the autoclave is vented when the pressure drop reaches 3 kg/cm$^2$. The autoclave is discharged and the walls inspected. They show no trace of build-up.

EXAMPLE 3

Heat treatment is applied to the homopolymerisation of vinyl chloride in aqueous suspension as in Example 1, except that the reactor is swept exclusively with steam for 30 minutes at 60° C (residual pressure in the reactor: about 150 mm of mercury absolute) and the steam leaving the reactor is condensed in a condenser situated upstream of the vacuum system. No build-up is observed on the reactor walls. In addition, the residual vinyl chloride content in the reactor is reduced to about 50 parts per million by volume.

I claim:

1. Process for preventing build-up in a reactor during the free radical polymerisation of ethylenically unsaturated monomers, comprising subjecting the walls of the reactor, which reactor is empty of any liquid or solid phase, to heat treatment at a temperature above 60° C for more than one minute before the reactor is charged for purposes of polymerisation.

2. Process as in claim 1, wherein the temperature during heat treatment is above 75° C.

3. Process as in claim 1 wherein the temperature during heat treatment is below 100° C.

4. Process as in claim 1 wherein the reactor is kept under vacuum during heat treatment.

5. Process as in claim 4, wherein the absolute pressure in the reactor during heat treatment is below 350 mm of mercury.

6. Process as in claim 5, wherein the absolute pressure is below 100 mm of mercury.

7. Process as in claim 1 wherein the walls of the reactor are swept with a gaseous stream during heat treatment.

8. Process as in claim 7, wherein the gaseous stream is a stream of air.

9. Process as in claim 1 wherein the duration of heat treatment is between 1 and 30 minutes.

10. Process as in claim 7, wherein the heat treatment and sweeping are carried out immediately after the charge from the preceding polymerisation cycle has been removed from the reactor and the gaseous effluent is condensed to recover the residual monomers.

11. Process as in claim 10, wherein the gaseous sweeping stream consists of steam and the gaseous effluent is evacuated to a condenser in which the steam is condensed.

12. Process as in claim 11, wherein a vacuum pump is connected directly with the condenser.

13. Process as in claim 1 wherein the reactor is one which is used in the free radical polymerisation of ethylenically unsaturated monomers selected from vinyl and vinylidene chloride, vinyl and vinylidene fluoride, acrylonitrile, methyl acrylate and styrene.

14. Process as in claim 1 wherein the reactor is used for polymerisation in aqueous dispersion.

15. Process as in claim 1 wherein the reactor is used for the polymerisation of vinyl chloride in aqueous dispersion.

* * * * *